May 27, 1924.
F. C. WIDMANN
COMBINED SALT AND PEPPER SHAKER
Filed April 6, 1923
1,495,365
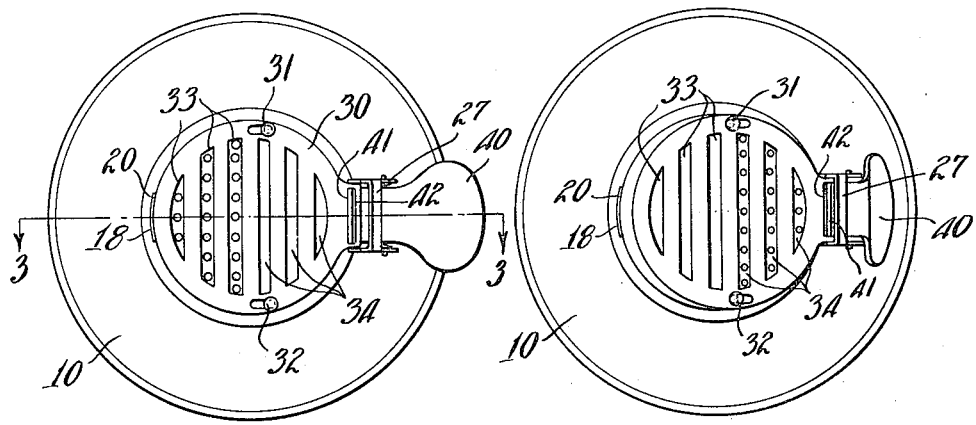
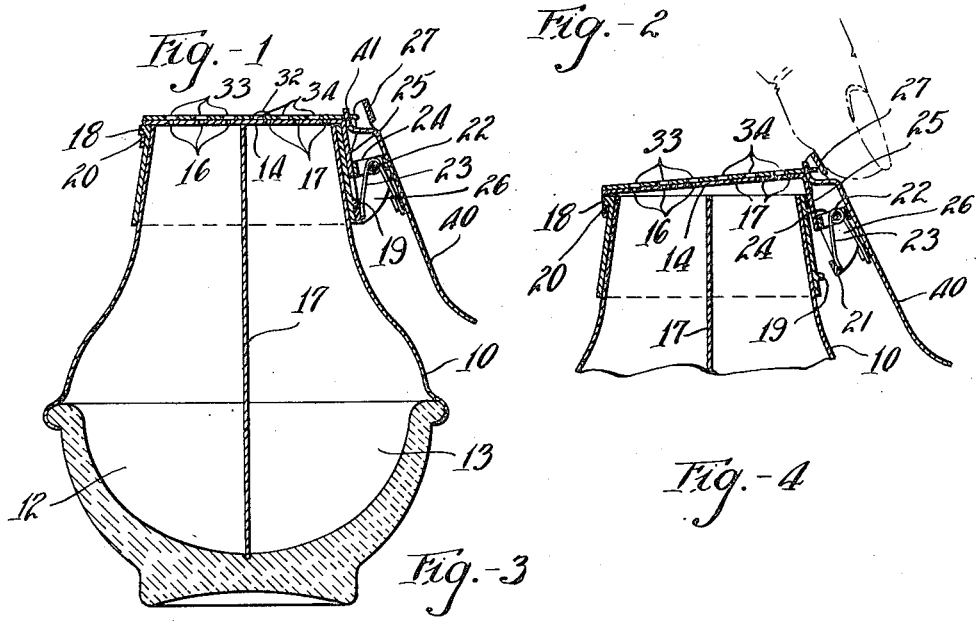
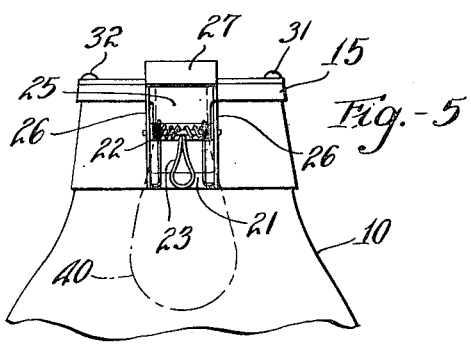
INVENTOR.
Frank C. Widmann,
BY Bates & Macklin,
ATTYS.

Patented May 27, 1924.

1,495,365

UNITED STATES PATENT OFFICE.

FRANK C. WIDMANN, OF CLEVELAND, OHIO.

COMBINED SALT AND PEPPER SHAKER.

Application filed April 6, 1923. Serial No. 630,235.

*To all whom it may concern:*

Be it known that I, FRANK C. WIDMANN, a citizen of the United States, residing at Cleveland, in the county of Cuyahoga and State of Ohio, have invented a certain new and useful Improvement in Combined Salt and Pepper Shakers, of which the following is a full, clear, and exact description, reference being had to the accompanying drawings.

This invention relates more particularly to a device for enabling one container to be used for holding different condiments, and has for one of its objects the arrangement of readily operable means for enabling either condiment at a time to be discharged from the container. Another object includes the arrangement of mechanism for selectively controlling the condiment to be discharged, which mechanism is automatically positioned to discharge the condiment most frequently used, to the exclusion of the other condiment. In addition my invention provides for an arrangement of mechanism whereby the condiment which is less frequently used may be discharged from the container to the exclusion of the other by a simple operation on the part of the user.

I have illustrated my invention as embodied in a combined salt and pepper shaker wherein one container is provided with a partition to form two compartments for receiving the salt and pepper respectively. A single closure having openings is disposed across the top of the container, and a selective device cooperating with the closure is arranged to permit the flow of one condiment to the exclusion of the other from the container.

The particular mechanism for enabling the selective control to be operated is hereinafter described in connection with the accompanying drawings, and the essential features of my invention are summarized in the claims.

In the drawings, Fig. 1 illustrates a plan view on an enlarged scale of a combined salt and pepper shaker showing the normal position of the selective device for permitting the flow of salt therefrom; Fig. 2 is a similar plan view of the container having the selective device in position to permit the flow of pepper therefrom; Fig. 3 is a vertical section taken on the correspondingly numbered line in Fig. 1; Fig. 4 is a section of a part of the container showing the manner in which the closure is removed from the container; and Fig. 5 is a side elevation of a portion of the container showing a device for locking the closure to the container.

In the drawings, I have illustrated my invention as a container 10 having a partition 11 extending therethrough to provide two compartments at 12 and 13 respectively. As illustrated, the compartment 12 is preferably used for holding salt and the compartment 13 for receiving pepper. The partition extends throughout the container and abuts the closure 14 to prevent the flow of one condiment while the other is being used and at the same time to prevent intermingling of the condiments.

The closure preferably comprises a cup-shaped member having a flanged portion 15 which closely engages the outer wall of the container and which is shown as provided with suitable openings, as at 16 and 17, on opposite sides of the partition for permitting the use of the condiments. To lock the closure to the container, I provide a pair of lugs 18 and 19 preferably disposed on diametrically opposite sides of the container and at different heights thereon. The lug 18 cooperates with an opening 20 in the flange of the closure, while the lug 19 cooperates with a yieldable latch 21. The latch 21 may be pivotally supported at 22, and may be urged inwardly by a spring 23 as shown particularly in Figs. 3 and 4. The pivotal connection 22 may be supported on a bracket 24 which is rigidly attached to an extension 25 shown as part of the closure. The latch is preferably provided with a pair of arms 26 which project above the closure and are provided with a bridge piece 27, for permitting engagement by the user, as shown in Fig. 4. Normally then, the spring 23 urges the latch toward the container wherefore the closure is locked when the latch engages the lug 19.

To permit selective use of the condiments in the container, I have illustrated a plate 30 being disposed above the closure and slidably mounted thereon by a pin and slot connection 31 and 32 respectively. The plate as shown is provided with openings 33 and 34 which are respectively disposed on opposite sides of the mid-portion thereof. The openings 33 cooperate with the openings 16, while the openings 34 cooperate with the openings 17 to permit the removal of the condiment from either compartment. For instance in the position shown in Fig. 1, the openings 33 are in registration with the openings 16, while the openings 34 are out of registration with the openings 17. Thus, when the container is used only the condiment in the compartment 12 is permitted to flow from the container.

To enable the condiment in the compartment 13 to be used, I provide a means for moving the plate 30 so as to uncover the openings 17 and to close the openings 16. The preferred means of accomplishing this, is to employ a lever 40 which is pivoted at 22, and which is arranged at one end, as at 41, to extend through an opening 42 in the plate 30. The lever 40 is normally urged to the position shown in Fig. 1 by the spring 23, which as heretofore explained, is also used for urging the latch into engagement with the container. Thus, a single spring 23 urges the latch and lever in opposite directions while the pin 22 forms the same pivotal connection for these members.

When a closure and selective device embodying my invention are placed upon a container having a partition extending therethrough, then the openings 16 are exposed as shown in Figs. 1 and 3. When it is desired however, to uncover the openings 17 and to close the openings 16, the user presses the lever 40 and thereby moves the plate 30 to the position shown in Fig. 2. This movement closes the openings 16 and uncovers the openings 17, and thus permits the flow of condiment from the other compartment. As soon as the pressure on the lever 40 is released, the spring 23 urges the lever outwardly, thus causing the plate to assume its former position. Accordingly, when the device is used in a combined salt and pepper shaker, the plate is automatically returned to a definite position to permit the removal of only the salt and when manually shifted, to discharge the pepper, the salt is automatically prevented from flowing from the compartment therefor. Moreover with the arrangement set forth, the openings in the slide or plate are pre-arranged to register with the openings in the container, wherefore there can at no time be a mixture of salt and pepper discharged from the container.

When it is desired to remove the closure for purposes of filling the compartments, the user presses the bridge member 27 as shown in Fig. 4, until the latch 21 clears the lug 19, and at the same time raises the closure to free the lug 18 from engagement with the opening 20.

From the foregoing description, it will be seen that my invention provides a device which when adapted to a combined salt and pepper shaker enables one container to be used for both condiments, and permits the use of one condiment to the exclusion of the other. It will further be seen that my invention sets forth a selective control means normally set for the major condiment, which is quite simple in construction, and which permits the use of a yieldable latch for positioning the closure on the container.

I claim:—

1. In combination, a container, a closure therefor, a slide movable relatively to the closure, a bracket carried by the closure adjacent the side of the container, a pair of levers pivotally mounted on the bracket, one of said levers being operatively connected with the slide, and the other of said levers providing a latch for locking the closure to said container, the force applying ends of said levers being disposed out of registration with each other, whereby each lever may be operated independently of the other lever.

2. In combination, a container, a closure therefor, a slide disposed above the closure, said closure having a depending portion adjacent the side of the container, a bracket carried by said portion, a pair of levers mounted on a common pivot in said bracket, one of said levers being operatively connected to the slide and the other of said levers being adapted to engage the container for locking the closure thereto, a spring for urging said levers in opposite directions so as to maintain the closure in locked position, and to maintain the slide in a pre-determined position, the locking lever having a portion projecting above the top of the slide, and the other lever having the force applying end thereof extending downwardly along the side of the container, whereby said levers may be operated independently of each other.

3. In combination, a container having a perforated closure therefor, a plate movable relatively to the closure carried thereby, said plate being arranged to uncover certain openings in the closure and to cover certain other openings in the closure when moved, a pair of members mounted on the same pivotal connection on the closure, one of said members being operatively connected with the plate and the other of said members cooperating with the container for locking a closure thereto, and a single spring associated with said members for automatically positioning the plate and locking the closure respectively.

4. The combination of a container, a closure therefor, a pair of lugs spaced at different heights on opposite sides of the container, said closure having an opening through which one of the lugs extends, a latch carried by the closure and cooperating with the other of said lugs to lock the closure to the container, a plate carried by the closure and movable relatively thereto, a lever mounted on the same pivotal connection as the latch and operatively connected to the plate, a single spring cooperating with the latch, a lever for automatically locking the closure to the container and positioning the plate on the closure so as to permit the discharge of contents from one compartment to the exclusion of the discharge of contents from the other compartment.

In testimony whereof, I hereunto affix my signature.

FRANK C. WIDMANN.